United States Patent
Goossens et al.

(10) Patent No.: US 9,503,810 B2
(45) Date of Patent: Nov. 22, 2016

(54) ARRANGEMENT FOR MIXING AT LEAST TWO AUDIO SIGNALS

(71) Applicant: INSTITUT FUR RUNDFUNKTECHNIK GMBH, Munich (DE)

(72) Inventors: Sebastian Goossens, Munich (DE); Jens Groh, Munich (DE); Christian Hartmann, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 45 days.

(21) Appl. No.: 14/382,212

(22) PCT Filed: Mar. 26, 2013

(86) PCT No.: PCT/EP2013/056448
§ 371 (c)(1),
(2) Date: Aug. 29, 2014

(87) PCT Pub. No.: WO2013/144168
PCT Pub. Date: Oct. 3, 2013

(65) Prior Publication Data
US 2015/0030182 A1 Jan. 29, 2015

(30) Foreign Application Priority Data
Mar. 27, 2012 (IT) .................. TO2012A0274

(51) Int. Cl.
H04B 1/00 (2006.01)
H04R 3/00 (2006.01)
H04S 3/00 (2006.01)
H04H 60/04 (2008.01)
G11B 27/34 (2006.01)
G11B 27/028 (2006.01)
G11B 19/00 (2006.01)

(52) U.S. Cl.
CPC ................. H04R 3/00 (2013.01); H04S 3/008 (2013.01); G11B 19/00 (2013.01); G11B 27/028 (2013.01); G11B 27/34 (2013.01); G11B 2220/2545 (2013.01); H04H 60/04 (2013.01)

(58) Field of Classification Search
None
See application file for complete search history.

(56) References Cited

U.S. PATENT DOCUMENTS

| | | | | |
|---|---|---|---|---|
| 5,701,346 A * | 12/1997 | Herre | .......... | H04S 3/02 381/18 |
| 5,850,453 A * | 12/1998 | Klayman | .......... | H03G 5/025 381/1 |
| 5,982,901 A * | 11/1999 | Kane | .......... | G11B 20/00992 348/614 |
| 7,110,554 B2 * | 9/2006 | Brennan | .......... | H03H 17/0266 381/71.6 |
| 2002/0154041 A1 * | 10/2002 | Suzuki | .......... | H04S 1/007 341/51 |
| 2006/0178870 A1 * | 8/2006 | Breebaart | .......... | G10L 19/008 704/205 |
| 2009/0070104 A1 * | 3/2009 | Jones | .......... | G01S 5/30 704/211 |
| 2011/0013790 A1 * | 1/2011 | Hilpert | .......... | G10L 19/008 381/300 |
| 2011/0293103 A1 * | 12/2011 | Park | .......... | G10K 11/1782 381/57 |
| 2012/0237055 A1 | 9/2012 | Groh | | |
| 2013/0108054 A1 | 5/2013 | Groh | | |
| 2015/0223002 A1 * | 8/2015 | Mehta | .......... | H04S 7/30 381/303 |

FOREIGN PATENT DOCUMENTS

| | | |
|---|---|---|
| DE | 102009052992 B3 | 3/2011 |
| DE | 102010015630 B3 | 6/2011 |
| WO | 2004/084185 A1 | 9/2004 |
| WO | 2011/057922 A1 | 5/2011 |

OTHER PUBLICATIONS

International Search Report dated Apr. 17, 2013, issued in PCT Application No. PCT/EP2013/056448, filed Mar. 26, 2013.

Written Opinion dated Apr. 17, 2013, issued in PCT Application No. PCT/EP2013/056448, filed Mar. 26, 2013.

* cited by examiner

*Primary Examiner* — Tan X Dinh
(74) *Attorney, Agent, or Firm* — Workman Nydegger

(57) ABSTRACT

In order to realize a correction for changes in the reproduction loudness at low frequencies in a downmix-arrangement, a mixing arrangement is proposed for mixing at least two audio signals, which mixing arrangement is provided with a first unit (104) for deriving a first power signal, which is a measure for the power of the first audio signal, a second unit (105) for deriving a second power signal, which is a measure for the power of the second audio signal, a cross-correlation unit (103) for deriving a cross-correlation signal, which is a measure for a cross-correlation between the first and the second audio signal, a unit (106) for deriving multiplication parameters from the first and second power signals and the cross-correlation signal, and a multiplication and combination unit (107) for carrying out a signal processing on the first and second audio signals and combining them. The unit (106) for deriving the multiplication parameters is provided with a combination unit (110) for deriving a combination signal which is a measure for a combination of the first and second power signals and the cross-correlation signal, and is provided with a scaling unit (109) for scaling one of the signals in the unit for deriving the multiplication parameters with a scaling signal. The scaling signal (D[k]) has a frequency characteristic which is a substantially constant below a first frequency value (kL), is increasing between the first frequency value (kL) and a second higher frequency value (kU) and is again substantially constant above the second frequency value. The unit (106) for deriving the multiplication parameters is further adapted to derive a single multiplication parameter m[k]) from the combination signal, and the multiplications and combination unit (107) is adapted to carry out a signal processing on the first and second audio signals which is equivalent to multiplying the first and second audio signals with this single multiplication parameter, and combining the so multiplied first and second audio signals.

20 Claims, 8 Drawing Sheets

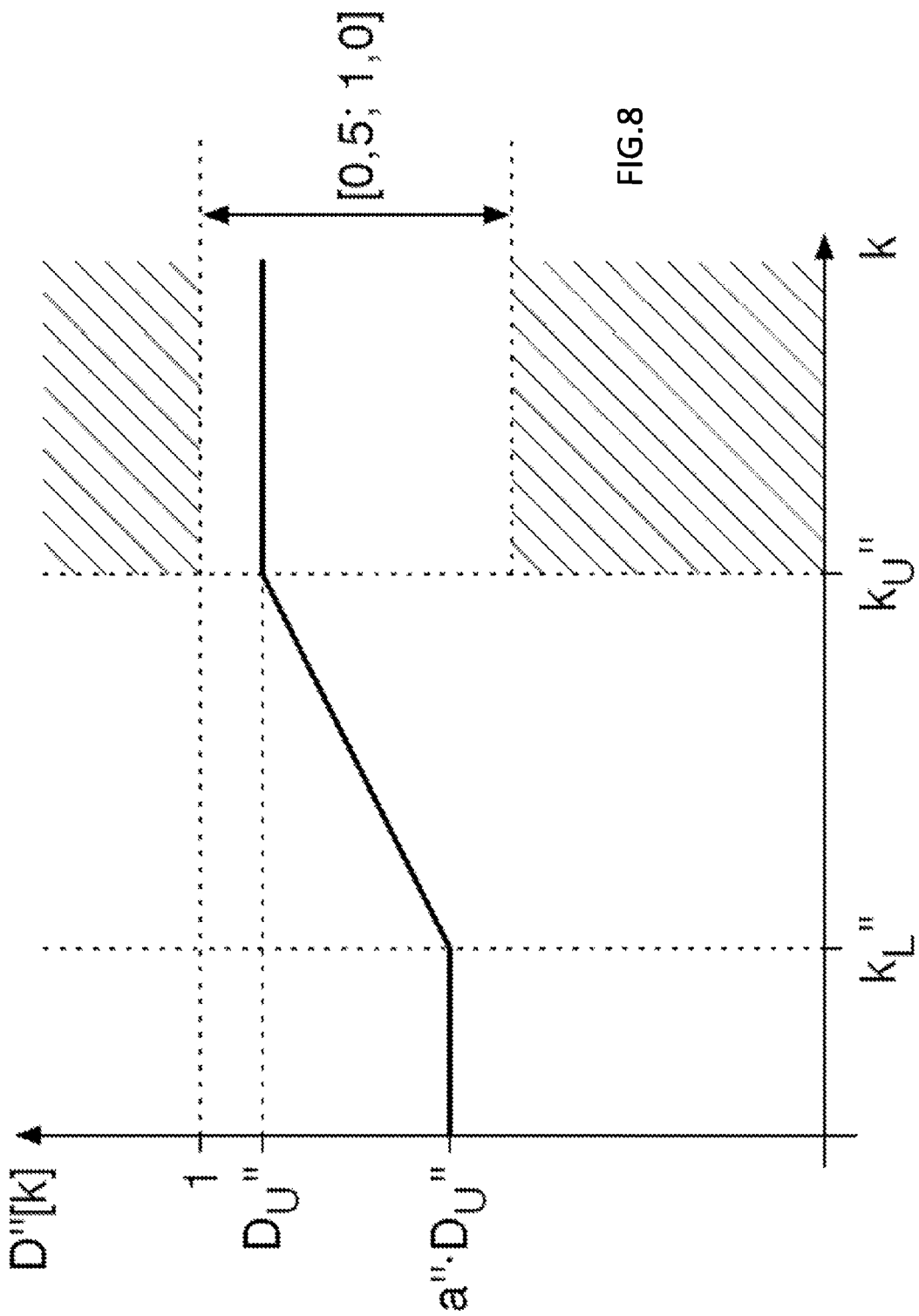

ARRANGEMENT FOR MIXING AT LEAST TWO AUDIO SIGNALS

INTRODUCTION TO THE DESCRIPTION

The invention relates to an arrangement for mixing at least two audio signals in accordance with the preamble of the main claim. An arrangement of that type is known from WO2011/057922A1 and is used there in a downmix arrangement for realizing a surround audio signal in a stereo audio signal.

Comb-filter compensation is used in this downmix arrangement that serves to eliminate sound coloration. The assumption is made in the process that a sound field arises during reproduction in which the average levels of sound power of the individual channels are added together. It therefore generates a frequency spectrum in the reproduction area on average that behaves as if the input signals to be mixed were uncorrelated.

The known downmix arrangement has the drawback that low frequency signal components are reproduced with the wrong volume in the comb-filter-compensated downmix.

Low frequency components in the channel signals typically agree in phase (or are at least strongly correlated) in audio productions. In that case, the phases of the acoustic waves of the individual channels hardly deviate from one another because of the large wavelength in the reproduction area as well, and the sound pressures would therefore be added together here, not the levels of sound power.

This frequently leads to the downmix comb-filter compensation leaving the bass range quieter than the remainder in music; it does "too much of a good thing", so to speak, with the power summation. A downmix based on customary addition (and thus without comb-filter compensation) would be more appropriate for the bass ranges. A sound engineer who created two separate mixtures for surround and for stereo could perceive these differences in the sound field when listening to it and would therefore take them into consideration in the mixture. But a set magnitude for the differences cannot be determined because the magnitude will be dependent upon the characteristics of the reproduction area in addition to the signal itself. The ratio of the direct sound component to the reverberant sound component is a decisive quantity here (see T. Görne, Tontechnik [Sound Engineering], p. 377).

The invention is based on the problem of proposing a mixing arrangement to ensure that the same perceived volume is achieved in the reproduction of the stereo version as in the original surround version in a surround-to-stereo downmix, in addition to a retention to a great extent of the timbre and spatial effect, and that the quality of the mixture will therefore approach that of a separate mixture by a sound engineer.

The mixing arrangement in accordance with the invention has the characterization called for in Claim 1 for that. Advantageous design forms of the mixing arrangement in accordance with the invention are contained in the subordinate claims.

The invention is based on the step of proposing scaling in the mixture that is dependent upon frequency. In particular, this scaling has a constant value $D_U$, dependent upon the frequency, for mid-range to high frequencies, and it is continuously reduced down to a small residual component $a \cdot D_U$ in a transition range towards the low frequencies.

Practical values for the transition range for typical reproduction areas are on the order of 250 . . . 500 Hz for the lower limit $k_L$, 750 . . . 1500 Hz for the upper limit $k_U$ and zero for the residual component factor a of the scaling signal. The choice of values for $k_L$, $k_U$ and a can also be used to optimize the mixture and can deviate from the above-mentioned typical values in the process, dependent upon the circumstances of the reproduction area.

The use of a straight-line function suggests itself for the transition.

An expanded solution idea is to carry out the scaling to a reduced extent, if at all, for spectral components to be added together that are anticorrelated vis-a-vis one another. This prevents the scaling measure from being at the expense of the desired balancing of comb-filter notches in the case that the latter also appear in low frequencies. Anticorrelated components can be identified by the fact that their accompanying value of the cross-correlation of the signals to be mixed falls below a threshold that preferentially has the value of zero.

The method of resolving this is to create a continuous transition between customary addition for low frequencies and power summation for higher frequencies in the downmix adder.

In the process, the scaling in accordance with the invention is applied to power summation in the frequency range that is given the capability of controlling the degree of its comb-filter compensation effect and, if necessary, the capability of making a distinction between spectral components to be added that are correlated vis-a-vis one another and those that are anticorrelated vis-a-vis one another.

It should be noted that DE102009052992 and WO2004/084185 also disclose arrangements for mixing at least two audio signals. However, insofar a scaling signal is disclosed in those documents, the scaling factor is a constant and not frequency dependent, let alone that they disclose the specific frequency dependency as claimed.

SUMMARY OF THE DESCRIPTION OF THE FIGURES

The invention will be further explained with the aid of a few examples in the following description of the figures. The following are shown in it:

FIG. 1 shows a first example of the mixing arrangement in accordance with the invention, FIG. 2 shows the behavior of the scaling signal as a function of the frequency in the example in accordance with FIG. 1, FIG. 3 shows a second example of the mixing arrangement in accordance with the invention, FIG. 4 shows a third example of the mixing arrangement that is an expanded version of the first example, FIG. 5 shows the behavior of the other scaling signal as a function of the frequency in the example in accordance with FIG. 3, FIG. 6 shows a fourth example of the mixing arrangement that is an expanded version of the second example, FIG. 7 shows a mixing arrangement for mixing more than two audio signals, and FIG. 8 shows the behavior of the scaling signal as a function of the frequency in the example in accordance with FIG. 6 in the case that the cross-correlation signal falls below the threshold value established in advance.

Figure 1:
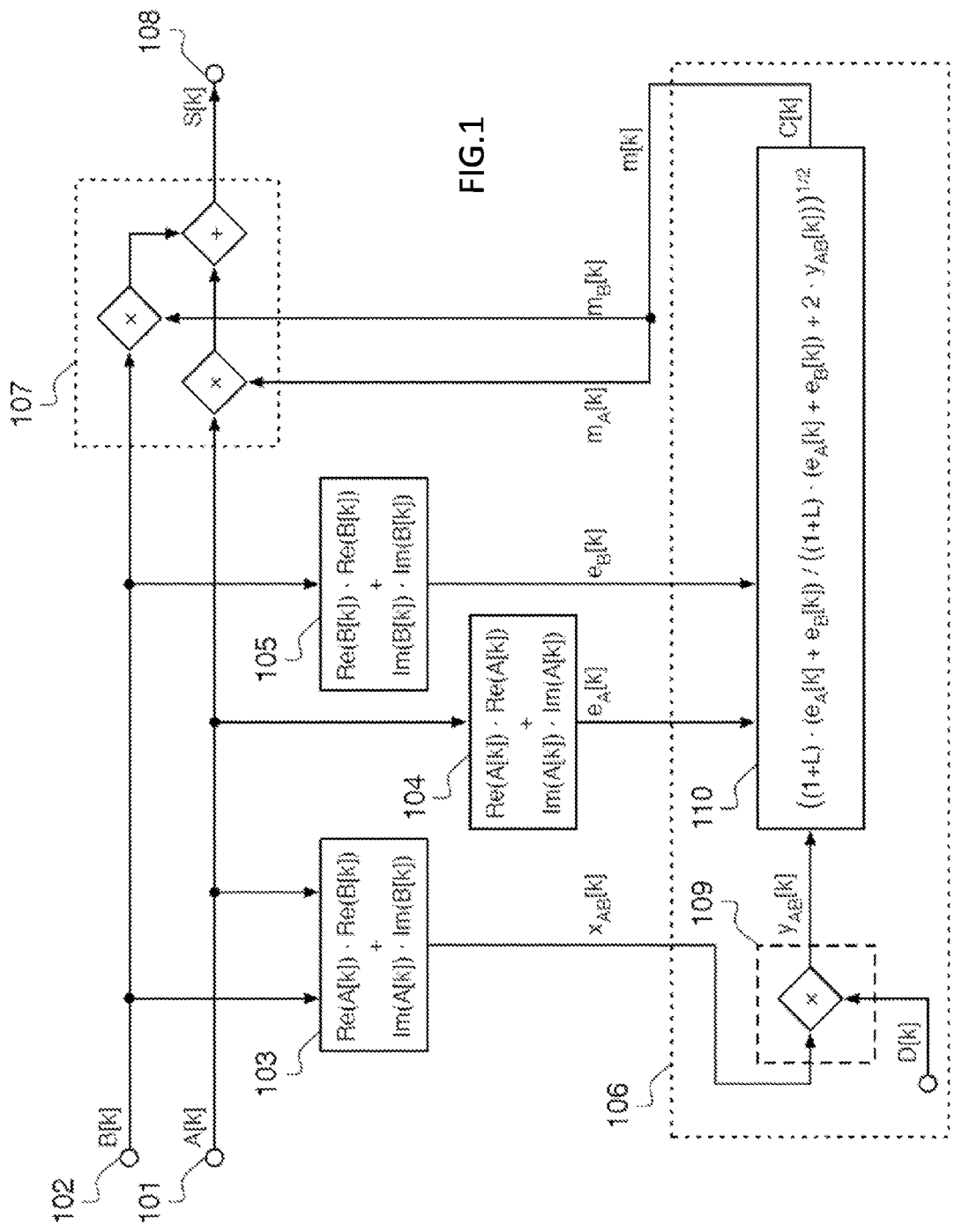
FIG. 1 shows an example of the mixing arrangement in accordance with the invention. Two audio signals are mixed to form a mixed audio signal in this example. The mixing arrangement is provided with a first input 101 and a second input 102 to receive the two audio signals A[k] and B[k], which have already been converted into the frequency range here. Both of the inputs are coupled to respective inputs of a cross-correlation unit (103) for deriving a cross-correlation signal $x_{AB}[k]$, which is a measure of the cross-correlation between the first and second audio signals A[k] and B[k], respectively. The input 101 is likewise coupled to an input of a first unit 104 for deriving a first power signal $e_A[k]$, which is a measure of the power of the first audio signal A[k]. The input 102 is likewise coupled to an input of a second unit (105) for deriving a second power signal $e_B[k]$, which is a measure of the power of the second audio signal B[k].

The mixing arrangement further comprises a unit 106 for deriving at least one multiplication parameter from the first and second power signals and the cross-correlation signal. Inputs of the unit 106 are coupled to respective outputs of the units 103, 104 and 105 for that. Furthermore, a multiplication and combination unit 107 is provided to carry out signal processing on the first and second audio signals A[k] and B[k]. Inputs of the multiplication and combination unit 107 are connected to the respective inputs 101 and 102 of the mixing arrangement for that. The multiplication and combination unit 107 is set up to carry out its signal processing on the first and the second audio signals A[k] and B[k], which is equivalent to multiplying the first audio signal A[k] by a multiplication parameter $m_A[k]$, multiplying the second audio signal B[k] by a multiplication parameter $m_B[k]$, and combining the first and second audio signals that are multiplied in that way to generate a mixed audio signal S[k] and to feed this mixed audio signal S[k] to an output 108.

The unit 106 for deriving the multiplication parameters is provided with a scaling unit 109 for scaling a signal in the unit 106 for deriving the multiplication parameters with a scaling signal D[k]. In this example, the cross-correlation signal $x_{AB}[k]$ is multiplied by this scaling signal D[k] to obtain a scaled cross-correlation signal $y_{AB}[k]$.

The scaled cross-correlation signal $y_{AB}[k]$ is fed to an input of a combination unit 110 for deriving a combination signal that is a measure of the combination of the first and second power signals $e_A[k]$ and $e_B[k]$, respectively, and of the (scaled in this case) cross-correlation signal $y_{AB}[k]$. Outputs of the first unit 103 and of the second unit 104 are likewise coupled to respective inputs of the combination unit 110 for that.

Figure 2:
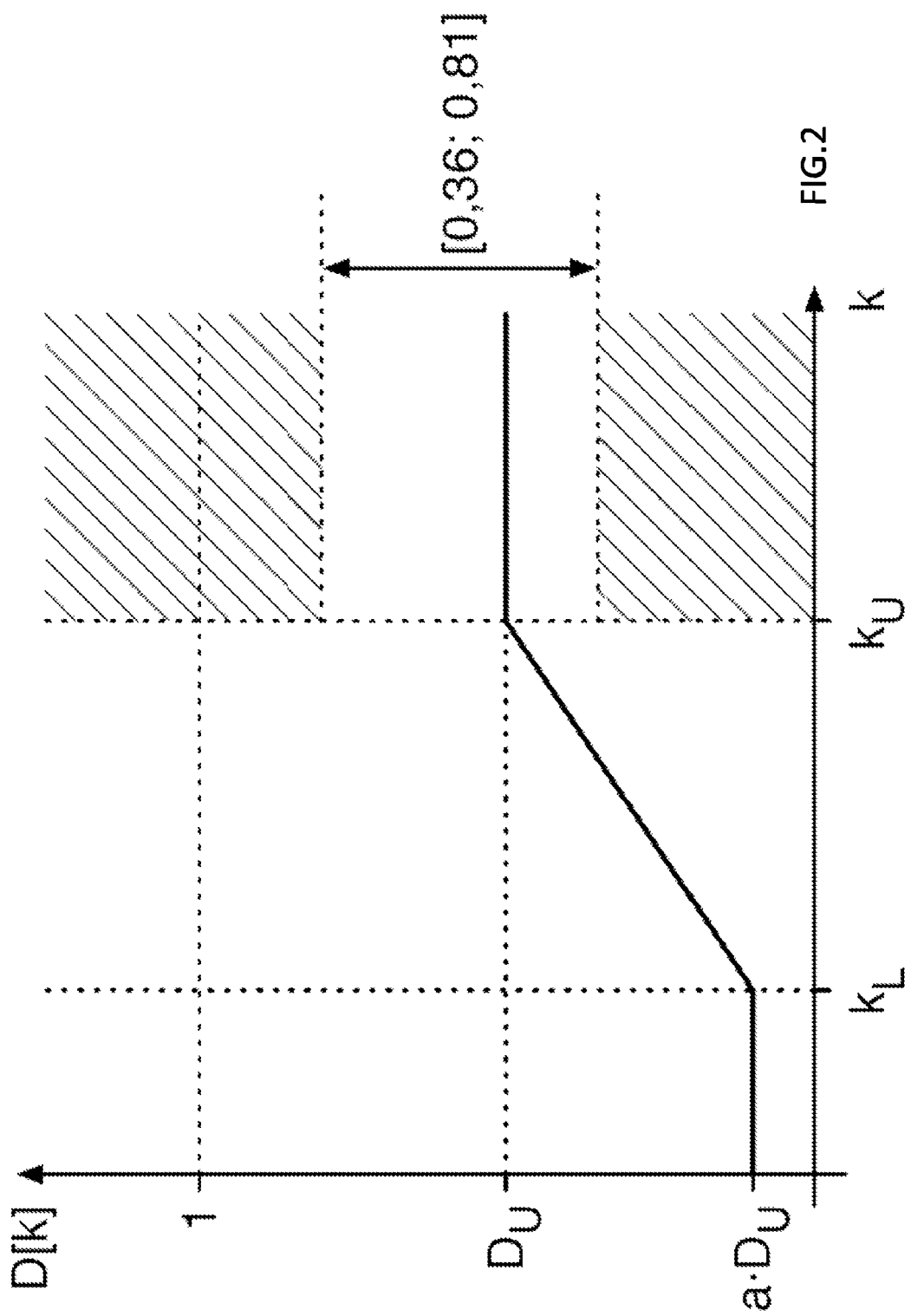

The scaling signal D[k] has a frequency characteristic as shown in FIG. 2. The frequency characteristic is substantially constant below a first frequency $k_L$, increases between the first frequency $k_L$ and a higher, second frequency $k_U$ and is again substantially constant above the second frequency $k_U$.

The substantially constant value above the second frequency $k_U$ is $D_U$, which lies in a value range [0.36; 0.81] and is preferably equal to 0.49. The substantially constant value below the first frequency $k_L$ is equal to $a \cdot D_U$; the following applies to a: $0 \leq a < 1$.

The combination unit 110 is set up in this example to derive the combination signal in accordance with:

$$C[k] = ((1+L) \cdot (e_A[k] + e_B[k]))/((1+L) \cdot (e_A[k] + e_B[k]) + 2 \cdot y_{AB}[k]))^{1/2}$$

L is greater than or equal to zero and brings about a limitation of the amount values of the derived multiplication parameters and a prevention of discontinuities of the output signal because of that and thereby a reduction in the probability of audibly disruptive artefacts. Typical values for L lie in the range [0.05; 0.5].

In this example, two parameters are derived by the unit (106) for deriving at least one multiplication parameter that are equal to one another and, in fact, the combination signal C[k] is equal to the two identical multiplication parameters here, and thus $C[k] = m[k] = m_A[k] = m_B[k]$.

The multiplication and combination unit 107 is consequently set up to carry out signal processing on the first and second audio signal that is equivalent to multiplying the first audio signal and the second audio signal by this single multiplication parameter and to combining the first and second audio signals that are multiplied in this way to obtain a mixed signal S[k]. This multiplication and combination process can be carried out as shown in FIG. 1. It speaks for itself, however, that the multiplication and combination are also possible in other ways. A[k] and B[k] could also be added together first, of course, and the summation signal could be multiplied by the single multiplication parameter m[k] after that.

The way in which the mixing arrangement of FIG. 1 operates will now be examined.

The multiplication and combination unit 107 brings about a mixture of the input signals A[k] and B[k] in which the amplitudes of the input signals are corrected in such a way that the power of the mixed signal corresponds to the sum of the power levels of the input signals for the most part. This correspondence brings about predominant compensation of the comb-filter effect. In addition, a requirement for this is that the signals that the mixture is applied to are audio signals converted to the frequency range and that the mixture is carried out in the manner that was described for the respective signal component of each frequency k.

The amplitude is corrected by the relevant multiplication of A[k] or B[k] by the multiplication parameters $m_A[k]$ or $m_B[k]$, respectively. The multiplication parameters are derived in turn from the input signals A[k] and B[k] in a specific way, as will be explained below, to achieve the above-mentioned correction in the process. A joint, single multiplication parameter m[k] is derived and identified with both $m_A[k]$ and $m_B[k]$ in the case of FIG. 1.

It is to be noted here that no amplitude correction, i.e. no comb-filter compensation, is brought about in the case that $m_A[k]$ and $m_B[k]$ are both set at 1. This is exploited to achieve the strived-for transition between the different degrees of the comb-filter compensation effect. A transition is brought about in a range between no comb-filter compensation and predominant comb-filter compensation by the variation of the derivation of $m_A[k]$ and $m_B[k]$. This variation is the subject matter of the following description of the unit 106 for deriving the multiplication parameters.

The method of operation of the unit 106 for deriving the multiplication parameters is based on a derivation of multiplication parameters for predominant comb-filter compensation, realized via the combination unit 110, and upstream scaling in 109.

The combination signal C[k] that is to be derived from the combination unit ensues from the power analysis mentioned at the outset; the derivation following from that will now be briefly outlined: A power condition is set up at first for complete comb-filter compensation, and arbitrary scaling is then added to the original derivation of a C[k] corresponding to this condition such that $m_A[k]$ and $m_B[k]$ both become 1 at the maximum scaling effect and the comb-filter compensation effect is eliminated because of that.

Complete comb-filter compensation would mean that the power $e_S[k]=\mathrm{Re}(S[k])\cdot\mathrm{Re}(S[k])+\mathrm{Im}(S[k])\cdot\mathrm{Im}(S[k])$ of the mixed signal $S[k]=A[k]\cdot m_A[k]+B[k]\cdot m_B[k]$ is equal to the sum of the power levels of the input signals, and thus $e_A[k]+e_B[k]$. It can be computationally deduced that this power equation is satisfied, among other times, when the original derivation of the multiplication parameters is defined as $$m_A[k]=m_B[k]=C[k]=((e_A[k]+e_B[k])/(e_A[k]+e_B[k]+2\cdot x_{AB}[k]))^{1/2}$$

with the definitions that are already known for $e_A[k]$, $e_B[k]$ and $x_{AB}[k]$. As already stated, only complete comb-filter compensation could be achieved with this original derivation without scaling.

It can be seen that the result goes to $C[k]=1$ when the cross-correlation $x_{AB}[k]$ goes to 0 in the original derivation. A gradual approach of the multiplication parameter to the value 1 can therefore be brought about in any case with an arbitrary, gradual reduction of $x_{AB}[k]$.

Scaling is done with the cross-correlation signal $x_{AB}[k]$ because of this relationship. It involves multiplication by the frequency-dependent scaling signal $D[k]$, and its result, $y_{AB}[k]$, replaces $x_{AB}[k]$ from the original derivation.

Only the additional factor $(1+L)$ applied to the power signals $e_A[k]$ and $e_B[k]$ is then lacking for the derivation specification of the combination signal in accordance with the invention. Its effect can be ignored for the explanation of the scaling.

The factor $(1+L)$ brings about a situation for $L>0$ in which a phase jump can arise that may be audibly disruptive under certain circumstances in the case that signal components of the input signals cancel one another. The cancellation has the prerequisite, among others, that the input-signal components are opposite in phase, and thus anticorrelated, vis-a-vis one another.

The scaling with $D[k]$ causes, as is strived for, the transition from predominant to reduced comb-filter compensation, which lies in the range between no comb-filter compensation and complete comb-filter compensation. Scaling with 1 would bring about complete comb-filter compensation, for instance; scaling with 0 would bring about no comb-filter compensation. The frequency dependence is therefore realized in the form of a frequency characteristic increasing with the frequency k. The cutoff frequency $k_U$ limits the range of high signal frequencies. The lower cutoff frequency $k_L$ limits the range of low signal frequencies. A transition range lies between them. The constant scaling value $D_U$ above the upper cutoff frequency $k_U$ causes high signal frequencies to be processed with predominant comb-filter compensation; the smaller constant scaling value $a\cdot D_U$ below the lower cutoff frequency $k_L$ causes low signal frequencies to be processed with reduced filter compensation. A transition curve without discontinuities is to be preferred; artifacts are avoided because of that. A straight-line segment is therefore suitable as a simple solution to a transition for the range between the cutoff frequencies. These features of the frequency characteristic are shown in the form of an example in FIG. 2. Other continuously increasing functions, for instance a parabola segment that connects the points $(k_L, a\cdot D_U)$ and $(k_U, D_U)$, are also suitable as transition curves; no discontinuities result from them.

The requirements for the values of $k_U$, $k_L$, $D_U$ and a follow from the perceptibility of comb-filter effects for high frequencies, from distortions of the volume for low frequencies and from artefacts. The values can be optimized and specified by the manufacturer or made available to the user for individual adjustment.

Figure 3:
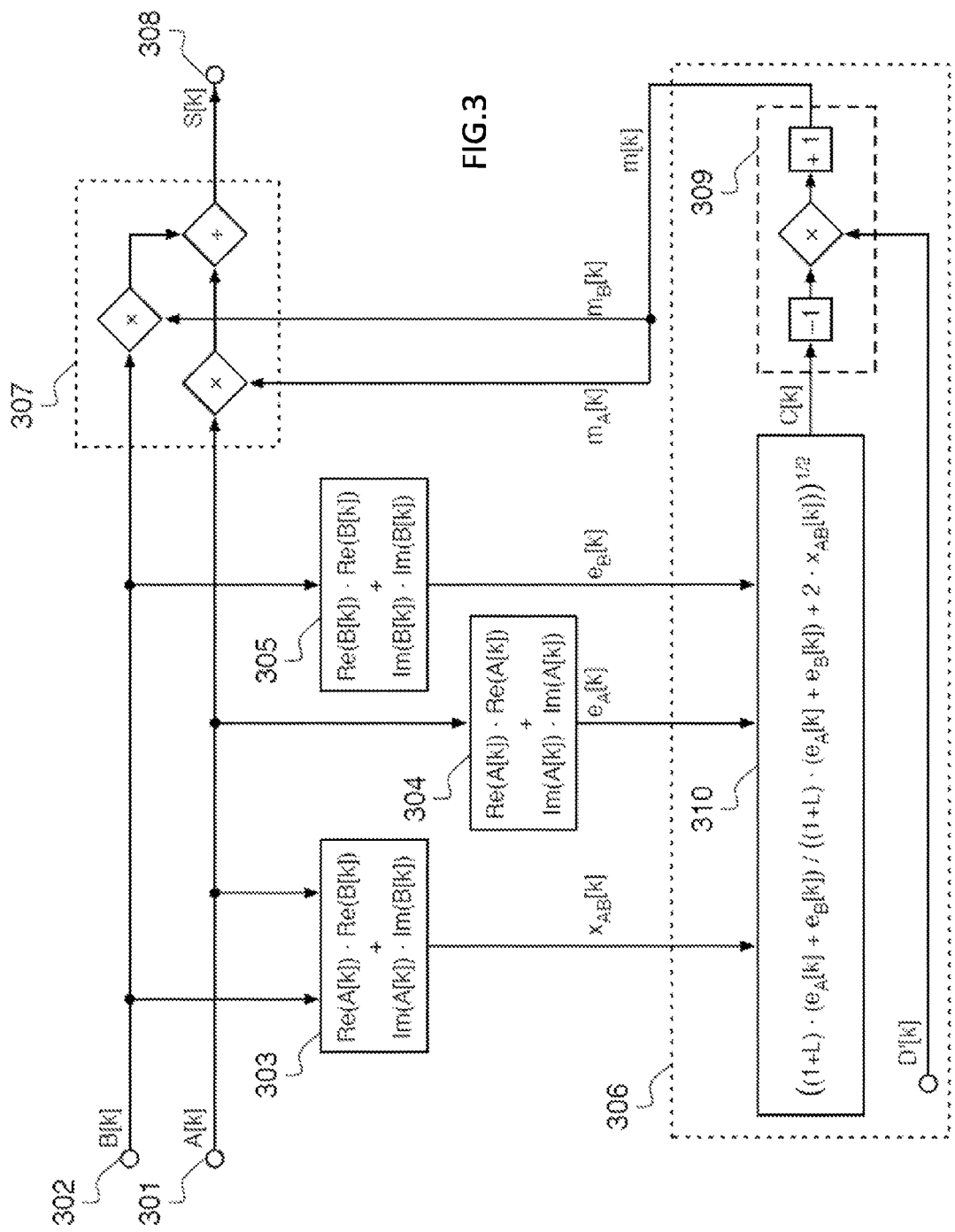

FIG. 3 shows a second example of the mixing arrangement in accordance with the invention. The mixing arrangement in FIG. 3 is similar to the mixing arrangement in FIG. 1. The mixing arrangement is provided with a first input 301 and a second input 302 to receive the two audio signals $A[k]$ and $B[k]$, which have already been converted into the frequency range here. Both of the inputs are coupled to the respective inputs of the cross-correlation unit 303 for deriving the cross-correlation signal $x_{AB}[k]$. The input 301 is likewise coupled to an input of the first unit 304 for deriving the first power signal $e_A[k]$. The input 302 is likewise coupled to the input of the second unit 305 for deriving the second power signal $e_B[k]$.

The mixing arrangement again comprises a unit 306 for deriving at least one multiplication parameter (in this case, two multiplication parameters again, $m_A[k]$ and $m_B[k]$, that are equal to one another) from the first and second power signals and the cross-correlation signal. Furthermore, the multiplication and combination unit 307 is provide to generate the output signal $S[k]$ at the output 308.

The unit 306 for deriving a multiplication parameter is once again provided with a scaling unit 309 for multiplying a signal in the unit 306 for deriving a multiplication parameter with a scaling signal $D'[k]$. In this example, the output signal of the combination unit 310 is multiplied by this scaling signal $D'[k]$ to obtain a scaled combination signal.

Figure 5:
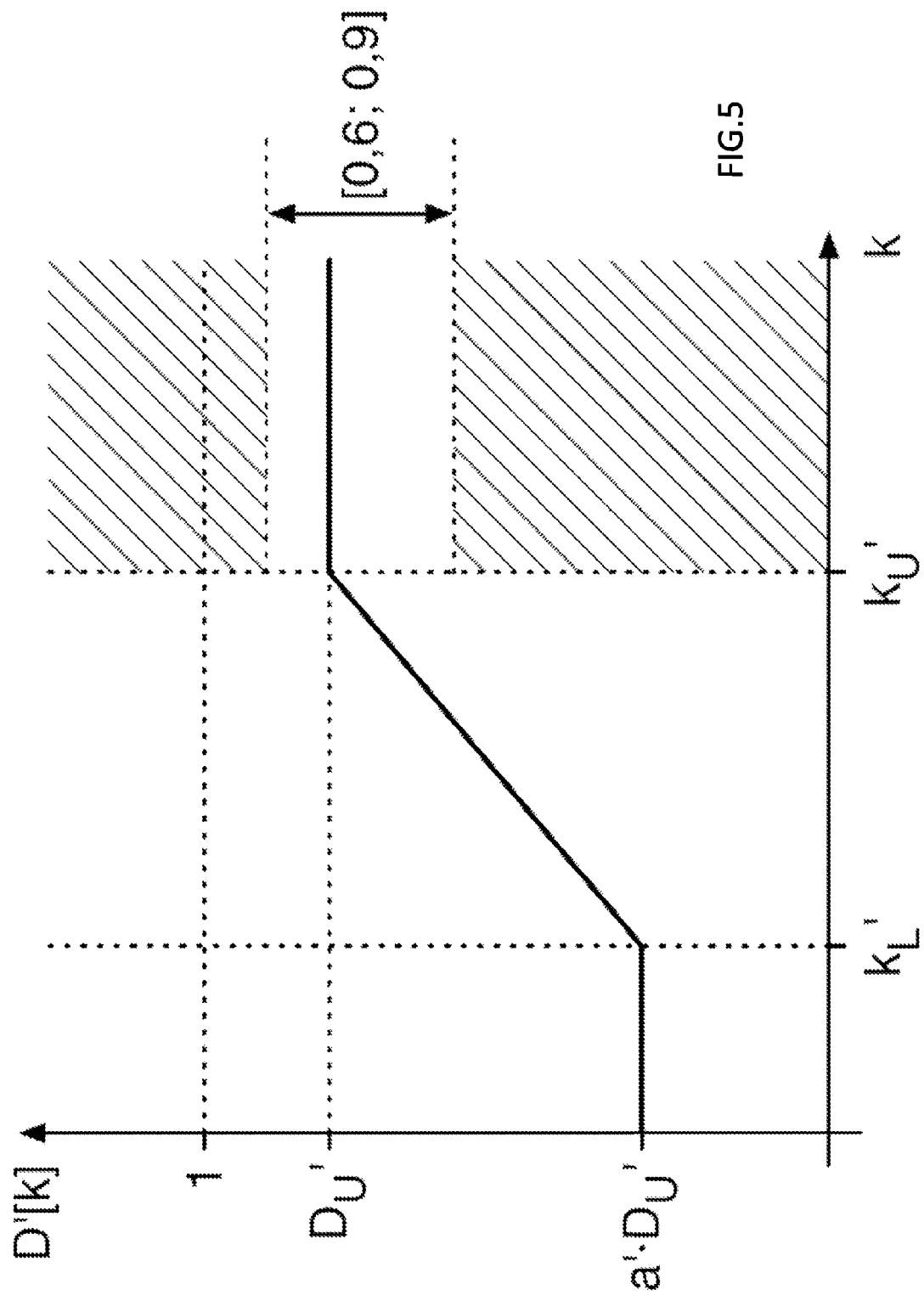

The scaling signal $D'[k]$ has a frequency characteristic as shown in FIG. 5. The frequency characteristic is substantially constant below a first frequency $k_L'$, increases between the first frequency $k_L'$ and a higher, second frequency $k_U'$ and is again substantially constant above the second frequency $k_r'$.

The substantially constant value above the second frequency $k_U'$ is $D_U'$, which lies in a value range $[0.6; 0.9]$ and is preferably equal to 0.7. The substantially constant value below the first frequency $k_L'$ is equal to $a'\cdot D_U'$; the following applies to $a'$: $0 \le a' < 1$.

The combination unit 310 is set up to derive a combination signal that is a measure of the combination of the first and second power signals $e_A[k]$ and $e_B[k]$ and the cross-correlation signal $x_{AB}[k]$. Outputs of the units 303, 304 and 305 are coupled to the respective inputs of the combination unit 310 for that.

The combination unit 310 is set up in this example to derive the combination signal $C[k]$ in accordance with:

$$C[k]=((1+L)\cdot(e_A[k]+e_B[k])/((1+L)\cdot(e_A[k]+e_B[k])+2\cdot x_{AB}[k]))^{1/2}$$

The combination signal is multiplied by the compensation signal $D'[k]$ in the following way in the scaling unit 309 to derive the scaled combination signal in accordance with:

$$(C[k]-1)\cdot D'[k]+1.$$

The unit 306 for deriving a multiplication parameter is further set up in this example to derive the single multiplication parameter $m[k]$ from the scaled combination signal in accordance with:

$$m[k]=(C[k]-1)\cdot D'[k]+1.$$

The way in which the mixing arrangement of FIG. 3 operates will now be examined.

The way in which it operates corresponds to a very great extent to what was explained for FIG. 1, except that a difference exists in the unit 306 for deriving a multiplication parameter, namely the scaling in 309 is downstream of the combination unit 310.

The combination signal C[k] to be derived from the combination unit 310 results in the same way as in 110.

It can be seen that, unlike in FIG. 1, a gradual approach of the multiplication parameter to the value 1 can also be brought about via an arbitrary, gradual reduction in the difference between C[k] and 1.

The scaling is done with the combination signal C[k] due to that relationship. It involves the subtraction of 1 here, the subsequent multiplication by the frequency-dependent scaling signal D'[k] and the subsequent addition of 1.

The scaling brings about the strived-for transition between various degrees of the comb-filter compensation effect in a way that is similar to 109. A scaling value of 1 would also bring about complete comb-filter compensation in 309, a scaling value of 0 would bring about no comb-filter compensation, and the frequency dependence is therefore realized in the form of a frequency characteristic increasing with the frequency k. Scaling values lying between 0 and 1 have a slightly different effect on the multiplication parameter in 306, however, than in 106. A separate frequency characteristic of the scaling signal D'[k] with its own features $k_U'$, $k_L'$, $D_U'$ and a' is therefore defined and optimized if necessary in 306. It is shown in the form of an example in FIG. 5. The corresponding requirements for its values are subject to the same considerations as in 106.

In general, $k_L$, in FIG. 2 will be equal to $k_L'$ in FIG. 5, and $k_U$ in FIG. 2 will be equal to $k_U'$ in FIG. 5 It cannot be ruled out, however, that values will be chosen in certain cases for $k_L$, and $k_U$ that differ from those for $k_L'$ and $k_U'$, respectively.

Figure 4:
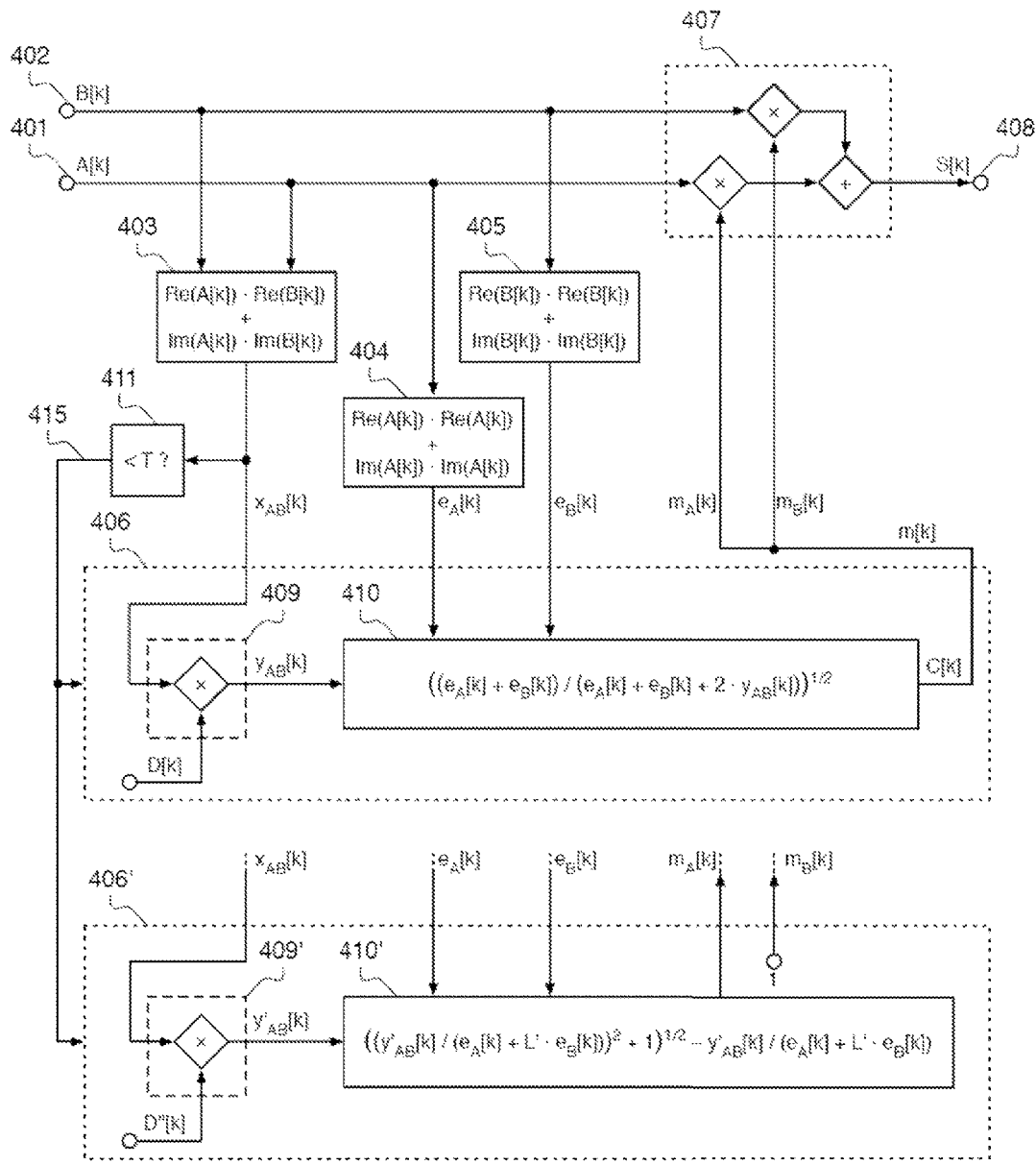

FIG. 4 shows a third example of the mixing arrangement in accordance with the invention. The mixing arrangement in FIG. 4 is similar to the mixing arrangement in FIG. 1. The example in accordance with FIG. 4 is essentially the example in accordance with FIG. 1, but it is additionally provided with a threshold detector 411. The threshold detector 411 is provided with an input coupled to the output of the cross-correlation unit 403. The cross-correlation signal $x_{AB}$[k] is compared in the threshold detector 411 with a threshold value T that is specified in advance.

If the cross-correlation signal $x_{AB}$[k] does not fall below the threshold value T, the multiplication parameters $m_A$[k] and $m_B$[k] will be derived in the unit 406 just as they are in the unit 106 for deriving the multiplication parameters that is shown in FIG. 1.

The formula in block 410 in FIG. 4 is in fact different than the one in block 110 in FIG. 1. But the assumption is made in FIG. 4 that L=0. And for L=0, the formula in block 110 in FIG. 1 directly changes to the formula in block 410 in FIG. 4. The specification of L=0 is allowed here, because anticorrelated input-signal components are excluded from the processing by the unit 406. Only correlated input-signal components are processed by the unit 406. This distinction is caused by the function of the threshold detector, which will be described later on. The way that L works has already been described for FIG. 1. It is evident from this that L, if L>0 is applicable, only fulfills its purpose, namely preventing phase jumps via possible cancellations, for anticorrelated input-signal components. Cancellations cannot be made for correlated input-signal components. Thus, the effect of L would not be needed for the correlated input-signal components exclusively processed in the unit 406; the remaining computational difference between the two formulas would be so minor for the correlated input-signal components that it has practically no significance. The specification of L=0 therefore results in the obvious simplification of the derivation formula in block 410 vis-a-vis that of block 110.

Different signal processing of the signals $x_{AB}$[k], $e_A$[k] and $e_B$[k] is carried out in the unit 406 to derive the multiplication parameters $m_A$[k] and $m_B$[k] for the case that the cross-correlation signal falls below the threshold value T. That is also indicated in FIG. 4 by the block 406'. The different form of signal processing in the unit 406' for deriving the multiplication parameters is explained in more detail below.

The cross-correlation signal is now multiplied by a different scaling signal D"[k] to obtain a scaled cross-correlation signal y'$_{AB}$[k]. The scaling signal D"[k] is shown in FIG. 8.

The scaling signal D"[k] has a frequency characteristic that is substantially constant below a third frequency $k_L$", that increases between the third frequency $k_L$" and a higher fourth frequency $k_U$" and that is one again substantially constant above the fourth frequency. The substantially constant value above the fourth frequency $k_U$" is $D_U$", lying in the value range [0.5; 1]. $D_U$" is preferably equal to 1. The substantially constant value below the third frequency $k_L$" is equal to a"·$D_U$"; a" lies in a value range [0; 1].

The first multiplication parameter $m_A$[k] is now derived in block 406' in accordance with:

$$m_A[k]=((y'_{AB}[k]/(e_A[k]+L'\cdot e_B[k]))^2+1)^{1/2}-y'_{AB}[k]/(e_A[k]+L'\cdot e_B[k])$$

The second multiplication parameter $m_B$[k] has a value equal to 1.

The threshold value T that is specified in advance is preferably equal to zero. The threshold detector 411 has an output for delivering a control signal that is fed into a control input of the unit 406, 406' for deriving the multiplication parameters. If the cross-correlation signal $x_{AB}$[k] is greater than or equal to the threshold value T, a first control signal is generated at the output of the threshold value detector 411. If the cross-correlation signal $x_{AB}$[k] is less than the threshold value T, a second control signal is generated at the output of the threshold value detector 411. The unit 406 for deriving the multiplication parameters operates as indicated in block 106 in FIG. 1 in response to the first control signal; L could be zero if necessary, as shown in block 406. The unit for deriving the multiplication parameters operates as indicated in block 406' in FIG. 4 in response to the second control signal.

The signal processing in the unit 406 (406') for deriving the multiplication parameters can be carried out with hardware or software and switching is therefore done with hardware or software as indicated in the blocks 406 and 406' in FIG. 4 in response to the first or second control signal 415, respectively.

The way in which the example in accordance with FIG. 4 works in the case that the cross-correlation signal $x_{AB}$[k] does not fall below the threshold value T has already been explained as it was with the aid of FIG. 1. The other signal processing in accordance with the block 406' will take effect in the case that the cross-correlation signal $x_{AB}$[k] exceeds the threshold value T. This manner of operation will be briefly explained here.

The arrangement according to FIG. 4 makes a distinction between correlated signal components and anticorrelated signal components with the aim of subjecting the latter to special treatment. A signal component of a frequency k is considered to be correlated or anticorrelated when the difference between the accompanying cross-correlation signal and the threshold value T is positive or negative, respectively. That is in line with the customary definition for the typical value T=0.

Correlated input-signal components are handled by the combination unit 410. The frequency-dependent reduction in the comb-filter compensation effect in 410 via the scaling unit 409 operates in the same way as in 110.

Anticorrelated input-signal components are handled by the combination unit 410'. The modified derivation specification for the combination unit 410' brings about complete comb-filter compensation, just like the one in 110, and a prevention of phase jumps for L'>0 in the cases in which signal components of the input signals cancel one another out. The frequency-dependent reduction in the comb-filter compensation effect in 410' via the scaling unit 409' operates in the same way as in 110.

A separate function D"[k] with its own function characteristics $k_U$", $k_L$", $D_U$" and a" is once again defined and optimized if necessary in 409'. It is shown in the form of an example in FIG. 8. The corresponding requirements for its values have already been described above.

The facts that D"[k] only refers to the anticorrelated signal components and that anticorrelated signal components do not usually arise for low frequencies bring about a situation in which a greater comb-filter compensation effect can be achieved for signal components of that type than would be the case if the were given the same treatment as the correlated signal components. To this end, a smaller frequency dependence is chosen for D"[k] than is the case for D'[k], in an advantageous way by making a">a'; $k_U$"=$k_U$' and $k_L$"=$k_L$" and $D_U$"=$D_U$' are retained. Included in that is also the possible requirement as a result of optimization that the frequency dependence of D"[k] will entirely disappear by choosing a"=1.

Figure 6:
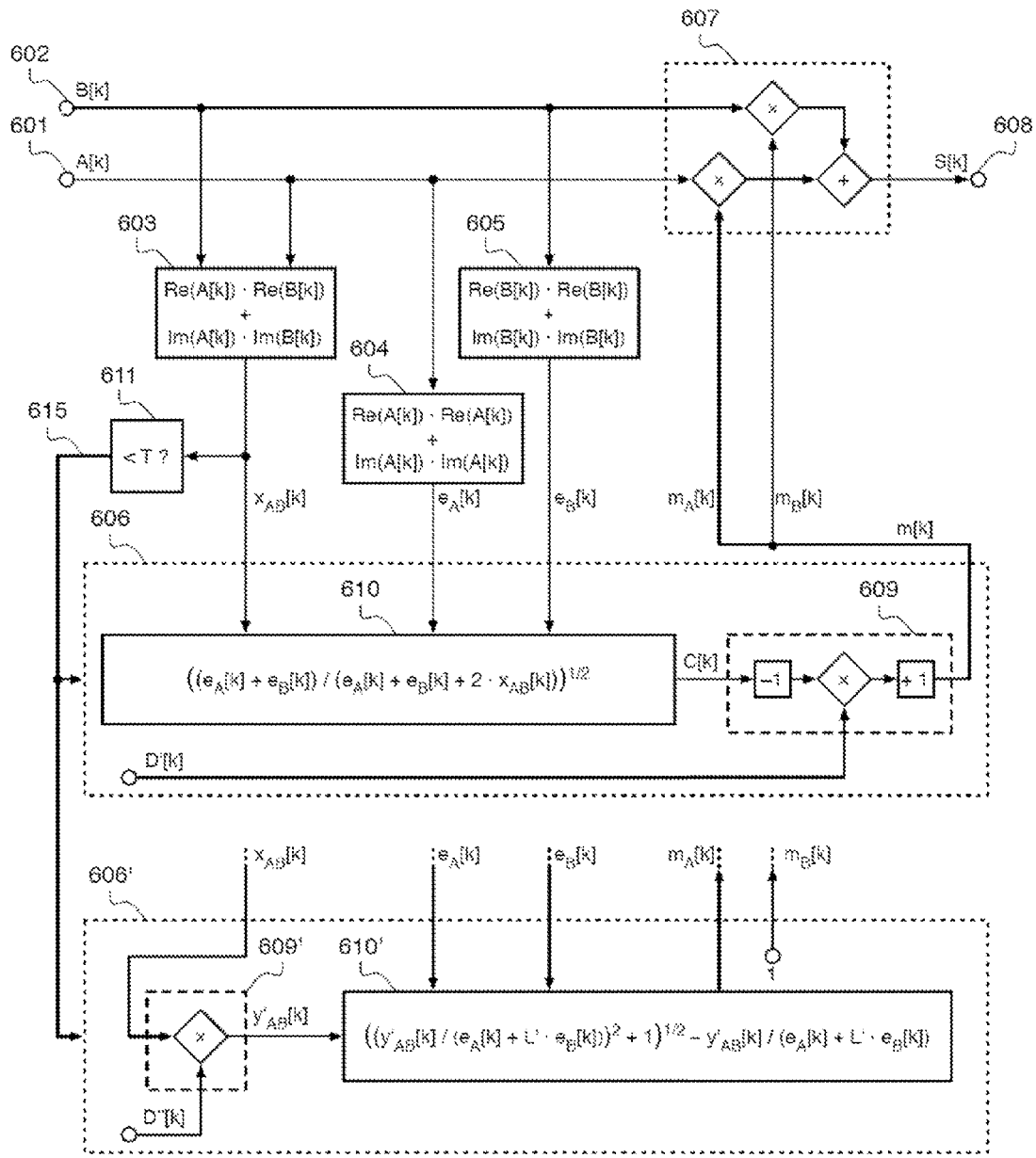

FIG. 6 shows a fourth example of the mixing arrangement in accordance with the invention. The mixing arrangement in FIG. 6 is similar to the mixing arrangement in FIG. 3 and the mixing arrangement in FIG. 4. The example in accordance with FIG. 6 is essentially the example in accordance with FIG. 3, but it is additionally provided with a threshold detector 611. The threshold detector 611 is provided with an input coupled to the output of the cross-correlation unit 603.

If the cross-correlation signal $x_{AB}$[k] does not fall below the threshold value T, the multiplication parameters $m_A$[k] and $m_B$[k] will be derived in the unit 606 just as they are in the unit 306 for deriving the multiplication parameters that is shown in FIG. 3.

The formula in block 610 in FIG. 6 is in fact different than the one in block 310 in FIG. 3. But the assumption is made in FIG. 6 that L=0. And for L=0, the formula in block 310 in FIG. 3 directly changes to the formula in block 610 in FIG. 6. This is allowed for the same reasons that were already described with the aid of FIG. 4.

Different signal processing of the signals $x_{AB}$[k], $e_A$[k] and $e_B$[k] is carried out to derive the multiplication parameters $m_A$[k] and $m_B$[k] for the case that the cross-correlation signal falls below the threshold value T. That is also indicated in FIG. 6 by the block 606'.

The different form of signal processing in the unit 606' for deriving the multiplication parameters is explained in more detail below.

The cross-correlation signal is now multiplied by a different scaling signal D"[k] to obtain a scaled cross-correlation signal $y'_{AB}$[k]. The scaling signal D"[k] is shown in FIG. 8 once again, and it has already been described in detail with the aid of FIG. 4.

The first multiplication parameter $m_A$[k] is now derived in block 606' in accordance with:

$$m_A[k]=((y'_{AB}[k]/(e_A[k]+L'\cdot e_B[k]))^2+1)^{1/2}-y'_{AB}[k]/(e_A[k]+L'\cdot e_B[k]).$$

The second multiplication parameter $m_B$[k] has a value equal to 1.

The manner of operation when $x_{AB}$[k] is less than the threshold value T is consequently the same as the manner of operation that was already described with the aid of FIG. 4.

The frequency-dependent reduction in the comb-filter compensation effect for correlated input-signal components in 610 via the scaling unit 609 operates in the same way as in 310.

The frequency-dependent reduction in the comb-filter compensation effect for anticorrelated correlated input-signal components in 610' via the scaling unit 609' operates in the same way as in 410'.

The signal processing in the unit 606 (606') for deriving the multiplication parameters can once again be carried out with hardware or software and switching is therefore done with hardware or software as indicated in the blocks 606 and 606' in FIG. 6 in response to the first or second control signal 615, respectively, from the threshold detector 611.

The input signals have been digitalized and already converted into the relevant frequency in all of the examples of the mixing arrangement that have been described.

In the digital solution, the first unit 104 or 304 or 404 or 604 has been set up to derive the first power signal $e_A$[k] in accordance with:

$$e_A[k]=Re(A[k])\cdot Re(A[k])+Im(A[k])\cdot Im(A[k]),$$

as was already indicated earlier.

The second unit 105 or 305 or 405 or 605 has been set up to derive the second power signal $e_B$[k] in accordance with:

$$e_B[k]=Re(B[k])\cdot Re(B[k])+Im(B[k])\cdot Im(B[k]).$$

The cross-correlation unit 103 or 303 or 403 or 603 has been set up to derive the cross-correlation signal $x_{AB}$[k] in accordance with:

$$x_{AB}[k]=Re(A[k])\cdot Re(B[k])+Im(A[k])\cdot Im(B[k]).$$

The mixing arrangements could have also been completely realized in an analog fashion. All of the units in the mixing arrangement, as described up to this point as digital circuits, would then be realized in an equivalent way as analog circuits.

Figure 7:
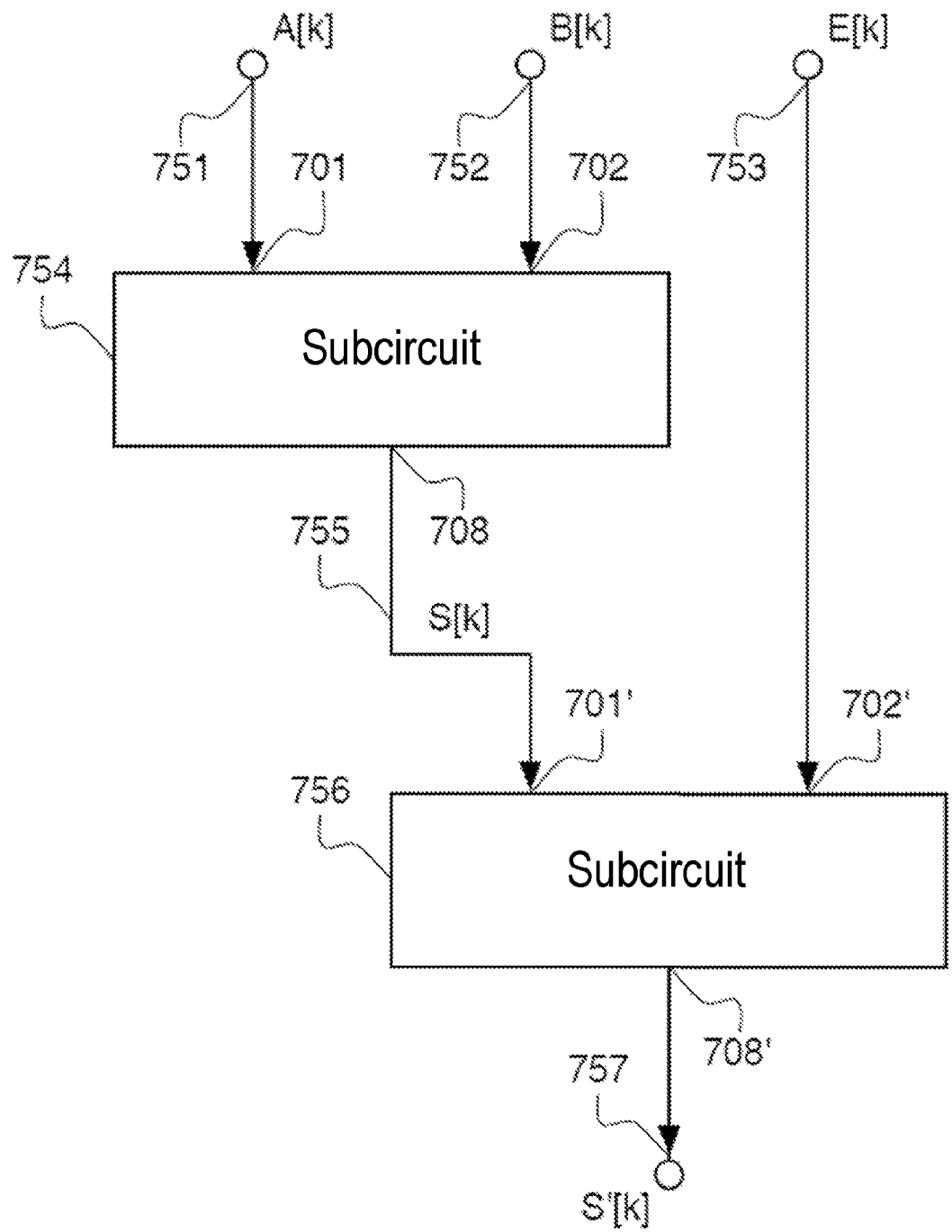

FIG. 7 shows an example of a mixing arrangement for mixing three audio signals in the form of a schematic diagram. The mixing arrangement is provided with three input terminals 751, 752, 753 to receive the three audio signals A[k] or B[k] or E[k] (which have already been converted once again into the frequency range). The two input terminals 751 and 752 are coupled to respective inputs 701 or 702 of a subcircuit that is indicated in FIG. 7 with the circuit block 754. This circuit block 754 contains one unit of the units that have already been described with the aid of FIG. 1, 3, 4 or 6. The audio signals A[k] and B[k] are consequently mixed in the subcircuit 754 as has already been described with the aid of FIG. 1, 3, 4 or 6. The audio signal S[k] of the subcircuit 754 is offered at an output 708. The output 708 is coupled to a first input 701' of a second subcircuit 756 via a line 755. The third input terminal 753 is coupled to a second input 702' of the second subcircuit 756.

This subcircuit 756 once again contains one unit of the units that have already been described with the aid of FIG. 1, 3, 4 or 6. The mixed signal S[k] that has already been generated in the subcircuit 754 and the audio signal E[k] are consequently mixed in the subcircuit 756 as has already been described with the aid of FIG. 1, 3, 4 or 6. The audio signal S'[k] of the subcircuit 756 is offered at an output 708'. The output 708' is coupled to the output terminal 757 of the mixing arrangement.

It is to be mentioned here that the invention is not limited to the examples that were shown. The invention is defined as described in the claims. Different modifications of the examples that have been shown are therefore possible; the modified examples are still covered by the claims. The mixing arrangement could, as has already been mentioned, be designed in the form of an analog circuit or structured as a software solution in a microprocessor. As already discussed, the various elements in the blocks 107 or 307 or 407 or 607 can be structured in a different order.

In addition, it is to also be mentioned that a solution is also possible where the scaling unit 409' or 609' is located in front of the combination unit 410' or 610' in the examples in accordance with FIGS. 4 and 6, respectively; the scaling unit of the combination unit is switched in downstream in the manner that has already been shown in blocks 306 and 606 in FIG. 3 or FIG. 6, respectively.

The invention claimed is:

1. Arrangement for mixing at least two audio signals, comprising:
   inputs for receiving the at least two audio signals,
   a first unit for deriving a first power signal, which first power signal is a measure for the power of the first audio signal,
   a second unit for deriving a second power signal, which second power signal is a measure for the power of the second audio signal,
   a cross-correlation unit for deriving a cross-correlation signal, which is a measure of the cross-correlation between the first and second audio signal,
   a unit for deriving at least one multiplication parameter from the first and second power signals and the cross-correlation signal,
   a multiplication and combination unit for carrying out a signal processing on the first and second audio signals, which is equivalent to:
   multiplying the first audio signal with a multiplication parameter,
   multiplying the second audio signal with a multiplication parameter,
   combining the so multiplied first and second audio signals to generate a mixed audio signal,
   wherein the unit for deriving a multiplication parameter is provided with a combination unit for deriving a combination signal which is a measure for the combination of the first and second power signals and the cross-correlation signal, and provided with a scaling unit for scaling a signal component in the unit for deriving a multiplication parameter with a scaling signal,
   that the scaling signal (D[k]) has a frequency characteristic which is substantially constant in a frequency range below a first frequency value ($k_L$), increases in a frequency range between the first frequency value ($k_L$) and a second higher frequency value ($k_U$) and is again substantially constant in a frequency range above the second frequency value, that the unit for deriving a multiplication parameter is adapted to derive a single multiplication parameter (m[k]) from the combination signal, and that the multiplication and combination unit is adapted to carry out a signal processing on the first and second audio signals which is equivalent to:
   multiplying the first audio signal and the second audio signal with the single multiplication parameter, and combining the so multiplied first and second audio signals.

2. Arrangement as claimed in claim 1, wherein the substantially constant value of the frequency characteristic above the second frequency equals $D_U$, where $D_U$ lies in a value range [0.36; 0.81], and the substantially constant value below the first frequency equals $a \cdot D_U$, where a satisfies $0 \leq a < 1$.

3. Arrangement as claimed in claim 1, the first and second audio signals and the cross-correlation signals being signals converted in the frequency domain (A[k],B[k],S[k]), wherein the scaling unit is adapted to scale the cross-correlation signal by a scaling signal to derive a scaled cross-correlation signal according to the following formula:

$$y_{AB}[k] = x_{AB}[k] \cdot D[k]$$

where $y_{AB}[k]$ is the scaled cross-correlation signal, $x_{AB}[k]$ is the cross-correlation signal, D[k] is the scaling signal and k a frequency parameter.

4. Arrangement as claimed inn claim 3, wherein the combination unit (110) is adapted to derive the combination signal C[k] according to the following formula:

$$C[k] = ((1+L) \cdot (e_A[k] + e_B[k]) / ((1+L) \cdot (e_A[k] + e_B[k]) + 2 \cdot y_{AB}[k]))^{1/2}$$

where
$e_A[k]$ and $e_B[k]$ is the first and second power signal, respectively, and L is a constant limitation parameter, which value is non-negative and preferably lies in a value range [0.05; 0.5].

5. Arrangement as claimed in claim 4, wherein the unit for deriving a multiplication parameter is adapted to derive the single multiplication parameter from the combination signal according to the following formula:

$$m[k] = C[k]$$

where m[k] is the value of the single multiplication parameter.

6. Arrangement as claimed in claim 1, wherein the substantially constant value of the frequency characteristic above the second frequency equals $D_U'$, where $D_U'$ lies in a value range [0.6; 0.9], and the substantially constant value below the first frequency equals $a' \cdot D_U'$, where a' satisfies $0 \leq a' < 1$.

7. Arrangement as claimed in claim 1, the first and second audio signals and the cross-correlation signals being signals converted in the frequency domain (A[k],B[k],S[k]), wherein the combination unit for deriving the combination signal C[k] is adapted to carry out a signal processing according to the following formula:

$$C[k] = ((1+L) \cdot (e_A[k] + e_B[k]) / ((1+L) \cdot (e_A[k] + e_B[k]) + 2 \cdot x_{AB}[k]))^{1/2}$$

where
$e_A[k]$ and $e_B[k]$ is the first and second power signal, respectively, $x_{AB}[k]$ is the cross-correlation signal, L is a constant limitation parameter lying in a value range [0.05; 0.5], and k a frequency parameter.

8. Arrangement as claimed in claim 7, wherein the scaling unit is adapted to scale the combination signal by a scaling signal for deriving the scaled combination signal according to the following formula:

$$(C[k] - 1) \cdot D'[k] + 1$$

where D'[k] is the scaling signal.

9. Arrangement as claimed in claim 8, wherein the unit for deriving a multiplication parameter is adapted to derive the single multiplication parameter from the scaled combination signal according to the following formula:

$$m[k]=(C[k]-1) \cdot D'[k]+1$$

where m[k] is the single multiplication parameter.

10. Arrangement as claimed in claim 4, wherein L=0.

11. Arrangement as claimed in claim 1, wherein it is further provided with a threshold detector for:
   establishing whether the cross-correlation signal is lower than a preset threshold value,
   generating a switching control signal in response to the cross-correlation signal being smaller than the threshold value, and
   supplying the switching control signal to the unit for deriving a multiplication parameter,
   and that the unit for deriving a multiplication parameter is adapted to switch-over to another signal processing step on the first and second power signals and the cross-correlation signal in response to receiving the switching control signal, for deriving a first multiplication parameter (mA[k]) and for deriving a second multiplication parameters (mB[k]) having a constant value, and that the multiplication and combination unit is further adapted to carry out a signal processing step on the first and second audio signals which is equivalent to multiplying the first audio signal by the first multiplication parameter and multiplying the second audio signal by the second multiplication parameter, and combining the so multiplied first and second audio signals.

12. Arrangement as claimed in claim 11, the first and second audio signals and the cross-correlation signals being signals converted in the frequency domain (A[k],B[k],S[k]), wherein the scaling unit is adapted to switch-over to another scaling step on the cross-correlation signal in response to receiving the switching control signal, according to the following formula:

$$y'_{AB}[k]=x_{AB}[k] \cdot D''[k]$$

where $y'_{AB}[k]$ is the scaled cross-correlation signal, $x_{AB}[k]$ is the cross-correlation signal, D''[k] is the other scaling signal for the other scaling step and k is a frequency parameter.

13. Arrangement as claimed in claim 12, wherein the other scaling signal (D''[k]) has a frequency characteristic which is substantially constant in a frequency range below a third frequency ($k_L$''), increases in a frequency range between the third frequency ($k_L$'') and a higher fourth frequency ($k_U$'') and is again substantially constant in a frequency range above the fourth frequency.

14. Arrangement as claimed in claim 13, wherein the substantially constant value of the frequency characteristic above the fourth frequency value ($k_U$'') equals $D_U$'', where $D_U$'' lies in a value range [0.5;1] and is preferably is equal to 1, the substantially constant value of the frequency characteristic below the third frequency value ($k_L$'') equals a''·$D_U$'', where a'' lies in a value range [0;1].

15. Arrangement as claimed in claim 12, wherein the unit for deriving a multiplication parameter is adapted to derive the first multiplication parameter ($m_A[k]$) according to the following formula:

$$m_A[k]=((y'_{AB}[k]/(e_A[k]+L' \cdot e_B[k]))^2+1)^{1/2}-y'_{AB}[k]/(e_A[k]+L' \cdot e_B[k])$$

where
$e_A[k]$ and $e_B[k]$ is the first and second power signal, respectively, $y'_{AB}[k]$ is the scaled cross-correlation signal, L' is a constant limitation parameter, whose value is non-negative and preferably lies in a value region [0.05; 0.5], k is a frequency parameter, and that the second multiplication parameter ($m_B[k]$) equals 1.

16. Arrangement as claimed in claim 11, wherein the preset threshold value equals zero.

17. Arrangement as claimed in claim 13, wherein the first frequency equals the third frequency, and the second frequency equals the fourth frequency.

18. Arrangement as claimed in claim 14, wherein substantially constant values a and a' equal preferably zero and a'' equals preferably 1.

19. Arrangement as claimed in claim 15, wherein L'=0.

20. Arrangement as claimed in claim 3, wherein the first unit is adapted to derive the first power signal according to the following formula:

$$e_A[k]=Re(A[k]) \cdot Re(A[k])+Im(A[k]) \cdot Im(A[k])$$

where A[k] are the frequency values of the first audio signal, converted in the frequency domain,
the second unit is adapted to derive the second power signal according to the following formula:

$$e_B[k]=Re(B[k]) \cdot Re(B[k])+Im(B[k]) \cdot Im(B[k])$$

where B[k] are the frequency values of the second power signal die, converted in the frequency domain, and
the cross-correlation unit is adapted to derive the cross-correlation signal according to the following formula:

$$x_{AB}[k]=Re(A[k]) \cdot Re(B[k])+Im(A[k]) \cdot Im(B[k]),$$

and where Re and are the real and imaginary parts, respectively, of the frequency values.

* * * * *